United States Patent [19]
Butcher et al.

[11] Patent Number: 5,306,973
[45] Date of Patent: Apr. 26, 1994

[54] MOUNTING BRACKET FOR OVERLOAD PROTECTORS

[75] Inventors: James A. Butcher; Mark F. Fleer, both of Fort Wayne, Ind.

[73] Assignee: General Electric Company, Fort Wayne, Ind.

[21] Appl. No.: 857,503

[22] Filed: Mar. 25, 1992

Related U.S. Application Data

[63] Continuation-in-part of Ser. No. 452,101, Dec. 18, 1989, Pat. No. 5,101,129.

[51] Int. Cl.$^5$ .................... H02K 11/00; H02K 5/00; H01B 17/26
[52] U.S. Cl. .................... 310/68 C; 310/89; 174/153 G
[58] Field of Search .................... 310/89, 68 C, 68 R; 403/240, 241, 331; 248/27.1, 27.3, 231.9, 608, 609; 174/65 G, 153 G

[56] References Cited

U.S. PATENT DOCUMENTS

| | | | |
|---|---|---|---|
| 3,123,662 | 3/1964 | Fink | 174/65 G |
| 3,395,297 | 7/1968 | Shifley | 310/71 |
| 3,502,917 | 3/1970 | Bizoe | 310/71 |
| 3,606,406 | 9/1971 | Walters | 403/240 |
| 4,128,006 | 12/1978 | Grabow | 73/724 |
| 4,139,755 | 2/1979 | Hastings et al. | 248/27.1 |
| 4,220,808 | 9/1980 | Fujita | 248/27.3 |
| 4,289,923 | 9/1981 | Ebert | 174/65 G |
| 4,325,525 | 4/1982 | Iafret | 248/27.3 |
| 4,346,274 | 8/1982 | Mutschler et al. | 248/27.1 |
| 4,406,936 | 9/1983 | Ohashi | 248/27.1 |
| 4,451,720 | 5/1984 | Ludwig | 248/27.3 |
| 4,678,879 | 7/1987 | Kenway | 248/27.3 |
| 4,729,534 | 3/1988 | Hill et al. | 174/153 G |
| 4,928,349 | 5/1990 | Oikawa et al. | 174/153 G |
| 4,965,478 | 10/1990 | Kobayashi et al. | 310/249 |
| 5,101,129 | 3/1992 | Butcher | 310/68 C |

FOREIGN PATENT DOCUMENTS 2005130 8/1971 Fed. Rep. of Germany .

OTHER PUBLICATIONS

Dwg. No. EX935-90, Texas Instruments Incorporated, "Mounting Variations for 2BM Motor Protector", Jul. 24, 1973.

*Primary Examiner*—Steven L. Stephan
*Assistant Examiner*—C. LaBalle

[57] ABSTRACT

A motor has a shell formed to include an edge defining an opening that is either U-shaped or rectangular. A reversible apparatus has segments for mounting an overload protector having first and second body portions within the opening in the motor shell. The apparatus has a first profile for mounting the overload protector within a U-shaped opening in a motor shell so as to restrict movement of the mounting apparatus and overload protector assembly relative to the motor shell, and a second profile for mounting the overload protector within a rectangular opening in a motor shell so as to restrict movement of the mounting apparatus and overload protector assembly relative to the motor shell. The apparatus also includes a first part extending generally parallel to, and across a first surface of, the overload protector, a second part extending generally perpendicular to the first part and across a second surface of the overload protector, and a third part extending generally perpendicular to the second part and across a third surface of the overload protector so as to secure the protector to the mounting apparatus. In one embodiment, tenons formed on end portions of the mounting apparatus engage mortises formed in the protector. A snap-fit arrangement may also be provided. Flexible or crushable beads may be provided to reduce the ingress of contaminants.

36 Claims, 4 Drawing Sheets

FIG_1a

FIG_1b

FIG_1c

FIG_2

FIG_3  FIG_4

FIG 5

FIG_6

MOUNTING BRACKET FOR OVERLOAD PROTECTORS

BACKGROUND AND SUMMARY OF THE INVENTION

This application is a continuation-in-part of copending application, Ser. No. 07/452,101 filed Dec. 18, 1989, and assigned to the same assignee as this application now U.S. Pat. No. 5,101,129.

This invention relates generally to mounting apparatus and, more particularly, to a mounting bushing and a mounting bushing and bracket for mounting an overload protector within an opening in a structure, such as a motor shell.

Thermally actuated overload protectors are often provided in combination with small electric motors and similar devices to protect such devices from the effects of prolonged mechanical and electrical overloads, or other conditions which may lead to temperature increases and thermal overload of the subject devices. One example of an overload protector used for this purpose is the 2BM series, manual reset thermal protector which is manufactured by the KLIXON ® subsidiary of Texas Instruments, Inc. The KLIXON ® 2BM thermal protector is a normally closed device designed to protect fractional horsepower motors, while occupying a limited amount of space. The 2BM protector is typically mounted within the motor shell, in or immediately adjacent an opening in the shell which provides access to the manually actuated "pop-out" reset button.

Typical mounting arrangements for the KLIXON ® 2BM thermal protector are described in Drawing No. EX 935-90 entitled "Mounting Variations for 2BM Motor Protector" which is available from Texas Instruments, Inc. of Attleboro, Massachusetts. These arrangements include a variety of metal brackets which are typically attached by screws or other means to some portion of the mounting surface, and which support the 2BM protector against axial and rotational movement relative to the motor shell. Another mounting technique described in Drawing No. EX 935-90 involves the use of a circular spring clip. The 2BM protector has a cylindrical portion which surrounds the reset button and which is normally disposed within an opening (e.g., a round hole) formed in the mounting surface. A metal spring clip is forced over the cylindrical portion of the protector after that portion has been positioned within a round opening in the motor shell to secure the cylindrical portion of the protector to the shell.

Another mounting technique which is presently used by the assignee of the present application, and which involves the use of threads formed on the surface of the cylindrical portion of the 2BM protector, employs a washer and nut having an internal diameter which matches the external diameter of the threaded portion of the 2BM protector. When the protector is installed in this manner, the threaded cylindrical portion is aligned with and inserted through a round hole formed in the supporting structure. The metal washer and nut are placed over and threaded onto the cylindrical portion of the protector until a tight fit is obtained. Another mounting technique which is presently used by the assignee of the present application involves the use of a generally U-shaped steel spring clip with a round hole centered at the bight of the U to permit access to the reset button, and several square holes on the remote ends of the arms of the clip for engagement by fingers formed on a flange formed on the body of the overload protector. The round hole is sized so as to allow room for the reset button and a metal mounting ring. The spring clip is positioned adjacent the hole in the motor housing and the metal mounting ring is swaged or otherwise formed in the round hole and the opening in the motor housing, thereby securing the spring clip to the motor housing. The overload protector is then pushed onto the spring clip so that the fingers formed on the flange on the body of the overload protector engages the square holes in the remote ends of the arms of the spring clip and the round hole receives the reset button.

Although the above-discussed techniques for mounting the 2BM protector have been somewhat successful, certain disadvantages to these techniques have been noted. Each of the metal brackets described in Texas Instruments Drawing No. EX 935-90 must be attached by screws or other means to the inside of the mounting surface. This normally requires a manual assembly operation and requires handling and installation of screws, rivets or other fasteners. Use of the spring clip or washer and nut arrangements may reduce assembly time and the number of parts required. However, these techniques still require manual assembly and manipulation of two or more relatively small parts. Moreover, all of these mounting devices are formed of metal and, thus, present some shock hazard or risk of short circuit in the event of insulation breakdown or improper installation of the devices.

Another disadvantage of the mounting arrangements described above involves damage to the exposed portion of the thermal protector during the assembly, handling, or installation processes. When the thermal protector is mounted through an opening in the side of a motor shell, the reset button and a part of the cylindrical portion of the protector body extends through the opening and outwardly from the surface of the shell. As groups of motors are conveyed through the assembly process or gathered together for packaging or further processing, the exposed reset button and cylindrical portion may be struck by other motors or otherwise impacted in such a manner as to cause damage to the exposed protector or mounting device. In this event, the entire motor must be returned to the assembly area for repair and reinstallation of a new thermal protector.

It is an object of the present invention to provide a novel arrangement for mounting a thermal protector which does not suffer from the disadvantages of prior art mounting arrangements.

Another object of the present invention is to provide a mounting arrangement for an overload protector which significantly reduces the material and labor costs associated with mounting the protector in a motor shell, as compared to prior art mounting techniques.

Another object of the present invention is to provide a one-piece, non-metallic mounting bushing for an overload protector which may be employed to more quickly and easily mount the protector within an opening in a motor shell, and which improves the overall quality and reliability of the finished product.

Yet another object of the present invention is to provide a mounting bushing for an overload protector which provides a degree of mechanical protection for the exposed portion of the thermal protector after the protector has been mounted within an opening in a structure.

These and other objects of the present invention are attained in a bushing for mounting an overload protector within an opening in a motor shell, which comprises a plurality of segments adapted to be coaxially positioned around a portion of the overload protector, means formed on at least one of these segments for restricting movement of the overload protector relative to the segments, and means formed on the segments for securing the segments within the opening so as to restrict movement of the bushing and overload protector assembly relative to the motor shell. In one embodiment of the invention, the plurality of segments comprise a pair of generally symmetrical segments which are connected together by an integral hinge to form a unitary structure. This unitary structure is preferably molded in a single piece from a moldable thermoplastic material, such as nylon. In addition to being provided with features which restrict axial and rotational movements of the overload protector relative to the mounting bushing and motor shell, each of the segments is provided with a portion which extends outwardly from the exterior surface of the shell when the bushing is operably positioned within the opening so as to shield an otherwise exposed end portion of the overload protector from damage.

In one embodiment of the invention, an apparatus is provided for mounting an overload protector having first and second portions within an opening in a motor shell. The apparatus comprises a plurality of segments, each having a first part and a second part. Each of the first parts has a first surface adapted for positioning adjacent an exterior surface of the first portion of the overload protector, and a second surface adapted for positioning within the opening in the motor shell. The second surfaces of the first parts include means for securing the segments within the opening so as to restrict movement of the mounting apparatus and protector assembly relative to the motor shell. Each of the second parts includes second means for engaging the second portion of the overload protector to restrict relative movement between the segments and the overload protector. The second portion of the overload protector includes a flange for engagement by the second means. Illustratively, the flange is formed to include mortises and the second means includes tenons. In one embodiment of the invention the first surfaces are formed to include flexible engagement means for cooperating with each other and the first portion of the overload protector to reduce the likelihood of entry of moisture and dust into the overload protector between the first parts and the first portion of the overload protector. The mounting apparatus further comprises a hinge for joining segments together to form a unitary structure. The unitary structure is formed of a flexible resinous material.

In another embodiment of the invention, an apparatus is provided for mounting an overload protector within an opening in a motor shell. The mounting apparatus comprises a first part extending generally across a first surface of the overload protector, a second part extending generally perpendicularly to the first part and across a second surface of the overload protector, and a third part extending generally perpendicularly to the second part and across a third surface of the overload protector so as to secure the protector to the mounting apparatus. In one embodiment of the invention, the third part includes third means for lockingly engaging the overload protector by a snap fit.

According to one aspect, the invention provides, in combination, a motor having a shell formed to include an edge defining an opening that is either U-shaped or rectangular in shape, and a reversible apparatus having segments for mounting an overload protector having first and second body portions within the opening in the motor shell. The apparatus comprises first means for mounting the overload protector within a U-shaped opening in a motor shell so as to restrict movement of the mounting apparatus and overload protector assembly relative to the motor shell. The apparatus further comprises second means for mounting the overload protector within a rectangular opening in a motor shell so as to restrict movement of the mounting apparatus and overload protector assembly relative to the motor shell.

Additional objects, features, and advantages of the invention will become apparent to those skilled in the art upon consideration of the following detailed description of preferred embodiments exemplifying the best mode of carrying out the invention as presently perceived.

DETAILED DESCRIPTION OF THE DRAWINGS

Figure 1A:
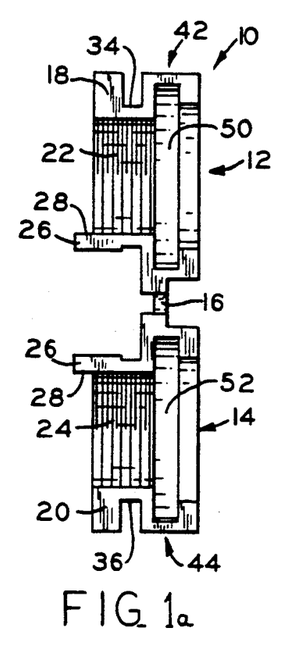
FIGS. 1(a), 1(b) and 1(c) show front, side and rear plan views of a bushing for mounting an overload protector which is constructed in accordance with the present invention.
Figure 1B:
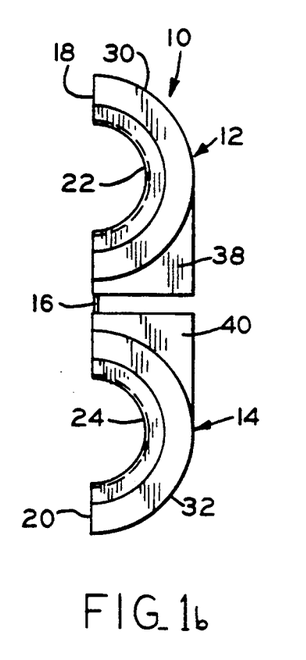
Figure 1C:
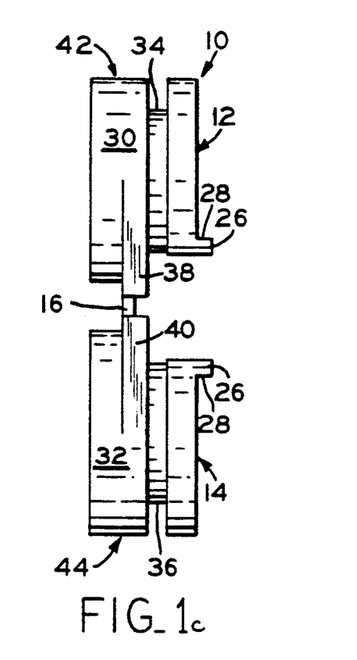

FIGS. 1(a), 1(b) and 1(c) show front, side and rear views of a bushing for mounting an overload protector within an opening in a motor shell. The preferred embodiment illustrated is especially well-suited for mounting a 2BM series, manual reset, thermal protector which is manufactured by KLIXON ® subsidiary of Texas Instruments, Inc. However, the principles of the present invention may be readily adapted to mounting other types of protectors without departing from the spirit of the present invention and the scope of the claims appended below.

FIG. 1(a) shows a mounting bushing 10 which comprises two segments 12 and 14 which are connected together by a hinge member 16. Segments 12 and 14 in the embodiment illustrated are generally symmetrical in shape, and are formed of a moldable thermoplastic material, such as nylon. Hinge 16 is integrally formed of the same material so that segments 12 and 14 and hinge member 16 form a unitary structure. This unitary structure simplifies and facilitates handling and incorporation of the bushing into an assembly which includes an overload protector and a motor shell, as described in additional detail below.

Segments 12 and 14 of bushing 10 have internal surfaces 18 and 20, respectively, which are designed for mating contact with one another, and for positioning adjacent an exterior surface of at least a portion of an overload protector. In the embodiment of the invention illustrated in FIGS. 1-4, portions 22 and 24 of surfaces 18 and 20, respectively, are threaded so as to mate with like threads formed on a cylindrical portion of the overload protector device. When bushing 10 is assembled around the threaded portion of the overload protector, the mating threads prevent axial movements of the protector, relative to bushing 10. Bushing 10 is further provided with a lip 26, formed on at least one of segments 12 and 14, extending adjacent to and coaxially with threaded portions 22 and 24 of internal surfaces 18 and 20. Lip 26 includes a flat surface 28 which, as illustrated more clearly in FIG. 4, is positioned adjacent a flat surface of the overload protector to prevent the protector from being moved rotationally, relative to bushing 10. This combination of features assures that the overload protector will be firmly secured against both linear (axial) and rotational movements, relative to mounting bushing 10.

Segments 12 and 14 of bushing 10 have respective external surfaces 30 and 32, upon which are formed circumferential grooves 34 and 36, respectively. Grooves 34 and 36 are used for securing bushing 10 within an opening (such as a slot) in a motor shell, as is illustrated in additional detail in FIGS. 2-6 below.

Another feature of bushing 10, which is illustrated clearly in FIG. 1(b), are triangular shield portions 38 and 40 which extend upwardly from one side of each of segments 12 and 14, and which extend outwardly from hinge member 16. Shield portions 38 and 40 serve to conceal what might otherwise be an exposed portion of a slot into which bushing 10 may be mounted, as illustrated in FIGS. 2 and 3.

Figure 3:
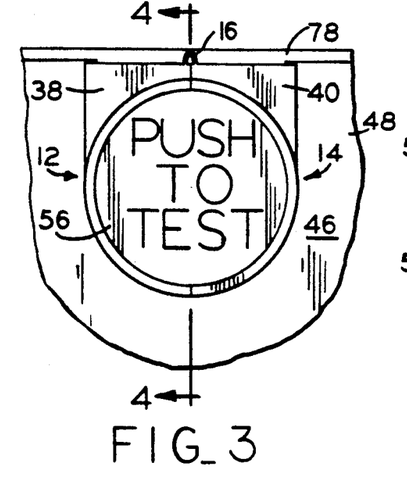
FIG. 3 shows a front view of the gasket member and bushing of FIG. 2 in position within the opening of the motor shell.
Figure 4:
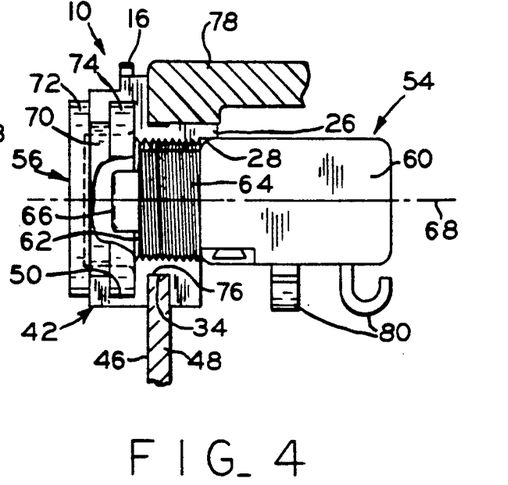
FIG. 4 shows a cross-sectional view, taken along line 4—4 of FIG. 3, of the components shown in FIG. 2 operably positioned within the opening of the motor shell.

Portions 42 and 44 of segments 12 and 14, respectively, extend outwardly from threaded portions 22 and 24 of the segments (i.e., outwardly from exterior surface 46 of motor shell 48, as illustrated in FIG. 3 and 4). Portions 42 and 44 perform at least two functions: they form a protective "hood" to shield the exposed portion of the overload protector from damage during assembly and handling of the motor; and they allow for the formation of circumferential grooves 50 and 52 (FIG. 1(a)) in the interior surfaces of segments 12 and 14, which grooves accept and retain a protective gasket member in position over the exposed end of the overload protector. Both of these functions are discussed in additional detail below in connection with FIGS. 3 and 4.

Figure 2:
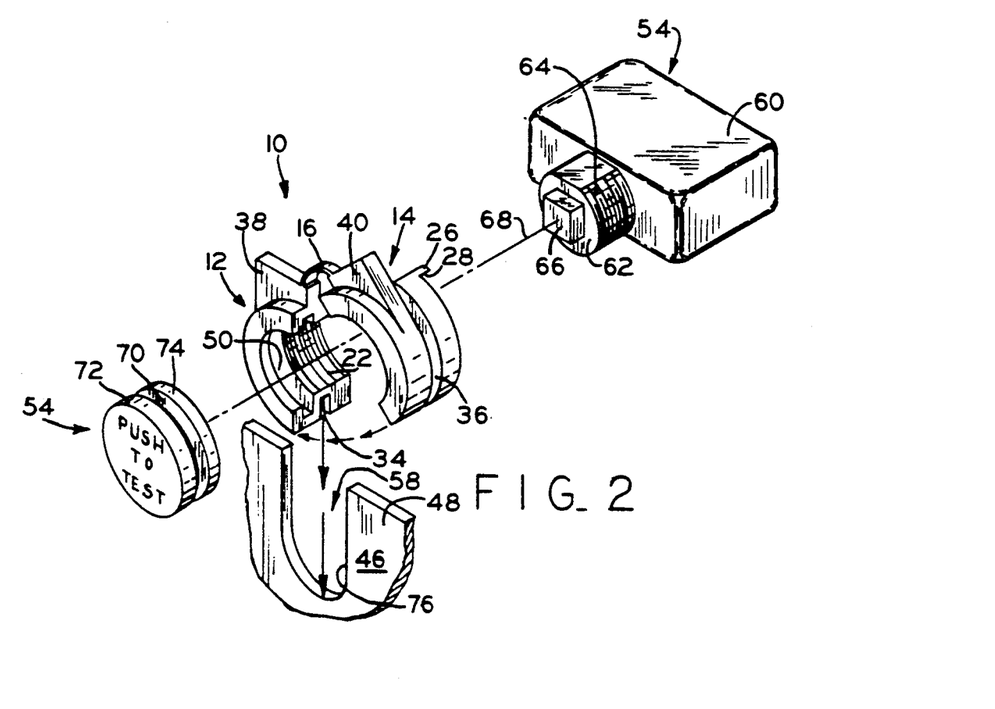
FIG. 2 shows an exploded view of the bushing of FIG. 1, an overload protector, a portion of a motor shell, and a gasket member, prior to assembly of the bushing, protector and gasket in an operable position within an opening in the motor shell.

FIG. 2 shows an exploded view of bushing 10, an overload protector 54 and a gasket member 56 immediately prior to assembly and positioning within an opening (slot 58) formed in motor shell 48. Overload protector 54 includes a rectangular body portion 60, which typically houses a thermal element and at least one set of electrical contacts, and a cylindrical portion 62. In the embodiment illustrated in FIG. 2, an external surface of cylindrical portion 62 is provided with threads 64. A reset button 66 is provided at the "exposed" end of cylindrical portion 62 which faces outwardly from body portion 60.

Cylindrical portion 62 of overload protector 54 is aligned along an axis 68, as illustrated in FIG. 2. Bushing 10 in FIG. 2 is coaxially aligned along axis 68, with segments 12 and 14 spread open so as to allow threaded portions 22 and 24 of segments 12 and 14 to be positioned adjacent the threaded exterior surface 64 of cylindrical portion 62 of overload protector 54. When segments 12 and 14 are closed around cylindrical portion 62, threaded portions 22 and 24 and the threads on exterior surface 64 mate to restrict relative movements of the segments and overload protector 54 along their common axis 68.

Gasket member 56 in FIG. 2 is a generally flat, cylindrically shaped rubber member which is provided with a circumferential groove 70 extending around its outer periphery. The presence of groove 70 in the cylindrical side wall of gasket member 56 creates front and back circumferentially extending lips 72 and 74, respectively. Lip 74 is adapted to be received within circumferential grooves 50 and 52 of segments 12 and 14, as is best illustrated in FIG. 4. Thus, when segments 12 and 14 are in a closed position, gasket 56 is held securely in position over reset button 66 and the exposed end of cylindrical portion 62 of overload protector 54.

After segments 12 and 14 have closed about portion 62 of overload protector 54 and lip 74 of gasket member 56, the gasket/bushing/protector assembly is inserted into an operable position within slot 58 of motor shell 48. Edge portion 76 is received within circumferential slots 34 and 36 of segments 12 and 14. Positioning of edge portion 76 within slots 34 and 36 secures the segments within the opening and restricts movement of the gasket/bushing/protector assembly relative to motor shell 48.

FIG. 3 shows a front view of the gasket/bushing/protector assembly after final positioning within slot 58 of motor shell 48. An end bell housing member 78 is shown in position to complete the mounting installation. FIG. 3 clearly illustrates the functions of shield portions 38 and 40 in covering portions of slot 58 which might otherwise be exposed. Shield portions 38 and 40 serve an aesthetic function in hiding the exposed portion of slot 58. In addition, portions 38 and 40 function to prevent entry of dust, dirt and other contaminants into the motor shell through exposed portions of slot 58.

FIG. 4 shows a cross-sectional view, taken along line 4—4 of FIG. 3, of the components shown in FIG. 2 operably positioned within slot 58 of motor shell 48. Also visible in FIG. 4 are electrical terminals 80 which exit through the bottom of rectangular portion 60 of overload protector 54, and which are available for connection to appropriate points within the control or power circuits of the associated device. The function of lip 26 is also clearly illustrated in FIG. 4. Lip 26 extends in generally parallel relation to central axis 68. Surface 28 of lip 26 lies adjacent the generally flat top surface of rectangular portion 60. The presence of lip 26 prevents overload protector 54 from rotating about axis 68 in either direction, and thus assures that terminals 80 will be maintained in proper position and orientation.

FIG. 4 also further illustrates the relative positioning of cylindrical portion 62 and reset button 66 relative to bushing 10 and gasket member 56. A portion of gasket member 56 is broken away in FIG. 4 to show reset button 66 in the "tripped" position (solid lines) and in the reset position (dashed lines). As illustrated, when overload protector 54 operates (i.e., trips or opens the circuit between terminals 80), reset button 66 extends outwardly from cylindrical portion 62 into the generally hollow interior of gasket member 56. The front portion of gasket member 56 (the periphery of which is defined by lip 72) is relatively soft and elastic so as to allow button 66 to be returned to the reset position easily, and without removal or disassembly of gasket member 56 or any of the other components.

Figure 5:
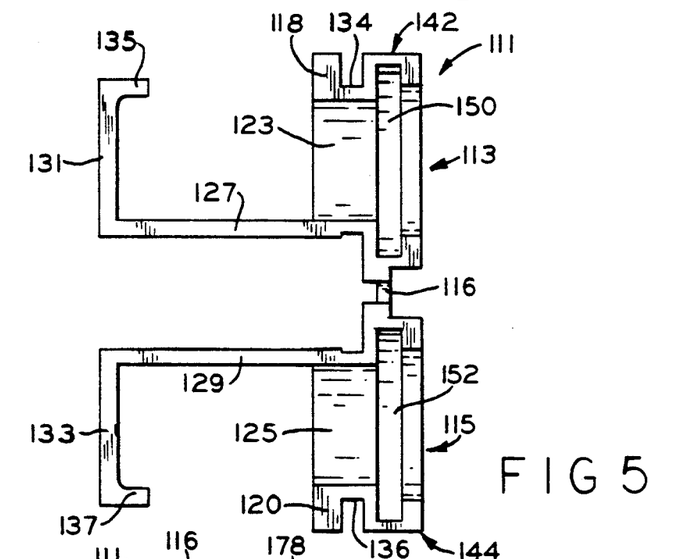
FIG. 5 shows a front plan view of an alternative embodiment of an overload protector mounting bushing constructed in accordance with the present invention.

FIG. 5 shows a front plan view of an alternative embodiment of the overload protector mounting bushing of the present invention. Some of the features of the embodiment of FIG. 5 are similar or identical to like features of the embodiment of FIGS. 1-4. Where appropriate, corresponding reference numbers (increased by 100 in the case of the second embodiment) are used for like features.

FIG. 5 shows a mounting bushing 111 which comprises two segments 113 and 115 connected together by a hinge member 116. As with the previous embodiment, segments 113 and 115 are generally symmetrical in shape, and may be formed of a moldable thermoplastic material, such as nylon. Segments 113 and 115 and hinge 116 are integrally formed of the same material to create a unitary structure having the associated advantages discussed above.

Segments 113 and 115 have internal surfaces 118 and 120, respectively, which are designed for mating contact with one another. However, unlike the embodiment of FIGS. 1-4, portions 123 and 125 of internal surfaces 118 and 120, respectively, are smooth, rather than threaded. The means for securing the overload protector against axial and rotational movements relative to the segments in the embodiment of FIG. 5 are structures formed on each of the segments which include: first portions 127 and 129 which extend outwardly and generally perpendicularly from segments 113 and 115, respectively; portions 131 and 133 which extend generally perpendicularly from the ends of portions 127 and 129, respectively; and portions 135 and 137 which extend generally perpendicularly from portions 131 and 133 inwardly toward segments 113 and 115.

Figure 6:
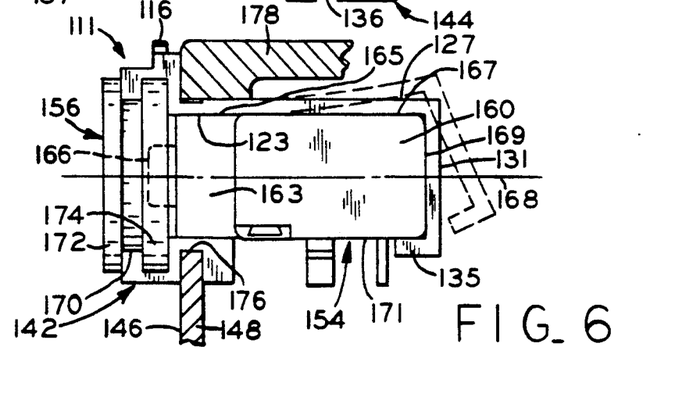
FIG. 6 shows a cross-sectional view of the bushing of FIG. 5, an overload protector, and a gasket member mounted within an opening in a motor shell.

FIG. 6 shows a cross-sectional view of bushing 111 and overload protector 154 and a gasket member 156, operably mounted within an opening in a motor shell 148. Overload protector 154 includes a generally rectangularly shaped body portion 160, and a cylindrically shaped portion 163. Unlike the corresponding body portion 62 of overload protector 54 shown in FIGS. 2 and 4, portion 163 has a smooth exterior surface 165. Rectangular body portion 160 of protector 154 has a generally flat top surface 167, a generally flat back surface 169, and a generally flat bottom surface 171. As illustrated in FIG. 6, portion 127 of bushing 111 extends across surface 167, portion 131 extends across surface 169, and portion 135 extends inwardly across part of surface 171, so as to secure overload protector 154 against movements (axial and rotational) relative to bushing 111. As illustrated by dashed lines in FIG. 6, portions 127 and 131 may be flexed somewhat to facilitate assembly of the overload protector and bushing. Thus, portions 127, 131 and 135 partially surround rectangular body portion 160 of protector 154, and hold portion 160 in position against opposing portions of bushing 111.

Other embodiments of the present invention are shown in FIGS. 7-11. Where appropriate, similar reference numerals from FIG. 5 have been increased by 100 or 200 and used to denote comparable elements in the embodiments shown in FIGS. 7-11.

Figures 7, 8:
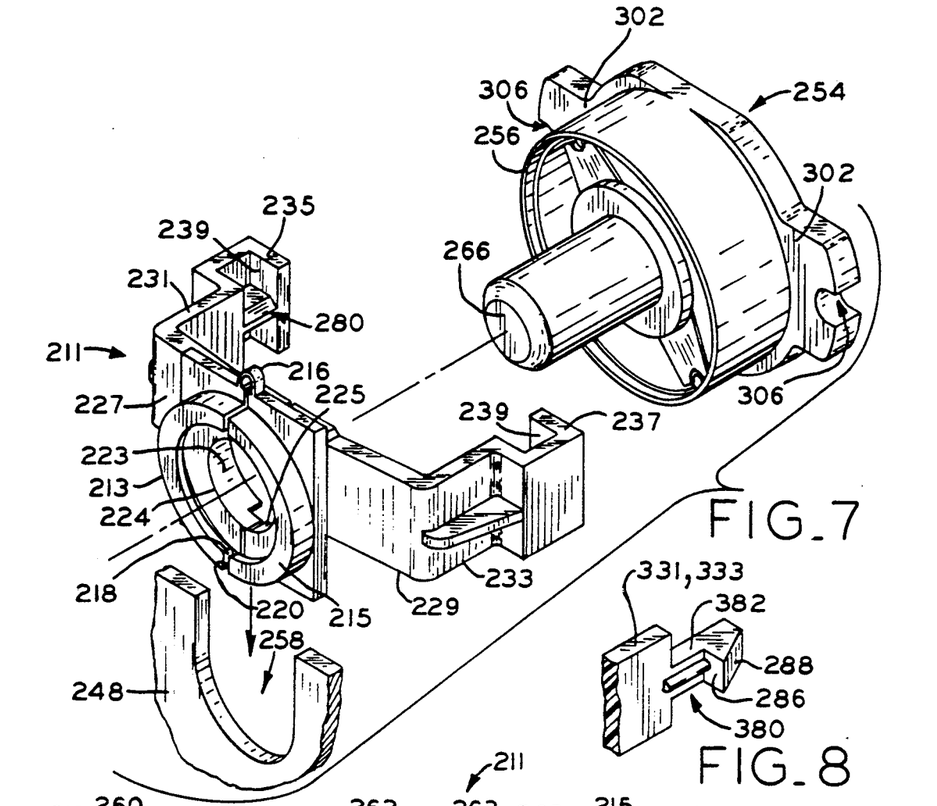
FIG. 7 is a fragmentary exploded perspective view showing one embodiment of the apparatus aligned to engage a U-shaped opening in a motor housing.
FIG. 8 shows an alternative embodiment of an end portion of the apparatus shown in FIG. 7.

FIG. 7 shows an alternative embodiment of a mounting bushing 211 in position to engage cylindrical member 266 of overload protector 254 and a U-shaped opening 258 in a motor shell 248. Segments 213 and 215 of mounting bushing 211 are connected by a hinge member 216. As with the previous embodiments, segments 213 and 215 are generally symmetrical in shape, and may be formed of a moldable resinous material. Segments 213 and 215 and hinge 216 are integrally formed of the same material to create a unitary structure having the associated advantages discussed above. Segments 213 and 215 have internal surfaces 218 and 220, respectively, which are designed for mating contact with one another. Surfaces 223 and 225 are smooth, rather than threaded, and are dimensioned to be in close, but non-interfering proximity to member 266 when mounting bushing 211 and overload protector 254 are operably positioned. A flexible bead 224 is formed on portions 223 and 225. Bead 224 reduces the likelihood of entry of dust, moisture and other contaminants into the overload protector between segments 213 and 215 and cylindrical member 266.

The means for securing the overload protector against movements relative to the segments in the embodiments of FIGS. 7-11 are structures formed on each of the segments which include: first portions 227 and 229 which extend outwardly and generally perpendicularly from segments 213 and 215, respectively; portions 231 and 233 which extend generally perpendicularly from the ends of the portions 227 and 229, respectively; and portions 235 and 237 which extend generally perpendicularly to portions 231 and 233, respectively, and toward each other when segments 213 and 215 are operably disposed.

In the embodiment illustrated in FIG. 7, tenons 280 are formed between portions 231 and 235 and between portions 233 and 237. The tenons 280 extend generally from, and longitudinally along portions 231 and 233. When operably positioned, the tenons 280 engage mortises 306 formed in flange 302 on overload protector 254. Portions 235 and 237 provide engagement surfaces 239 to prevent flange 302 from sliding off tenons 280. The resilient nature of the material from which mounting bushing 211 is formed prevents second portions 231 and 233 from spreading apart when mounting bushing 211 is positioned within opening 258 of motor shell 248, thereby preventing tenons 280 from disengaging flange 302.

An alternative construction of the end portion (i.e., the end which engages flange 302 of overload protector 254) is shown in FIG. 8. Tenon 380 engages mortise 306 with a snap fit. Tenon 380 extends longitudinally from a second portion 331 or 333. Extension 382 has approximately the same width as mortise 306 formed on flange 302 of overload protector 354. A beveled face 288 facilitates engagement of tenon 380 with mortise 306, and engagement surface 286 formed on tenon 380 engages flange 302, preventing tenon 380 from sliding longitudinally out of mortise 306. As in the embodiment of FIG. 7, the resiliency of mounting bushing 211 prevents second portions 331 and 333 from spreading apart, thereby preventing tenons 380 from disengaging flange 302.

Figure 9:
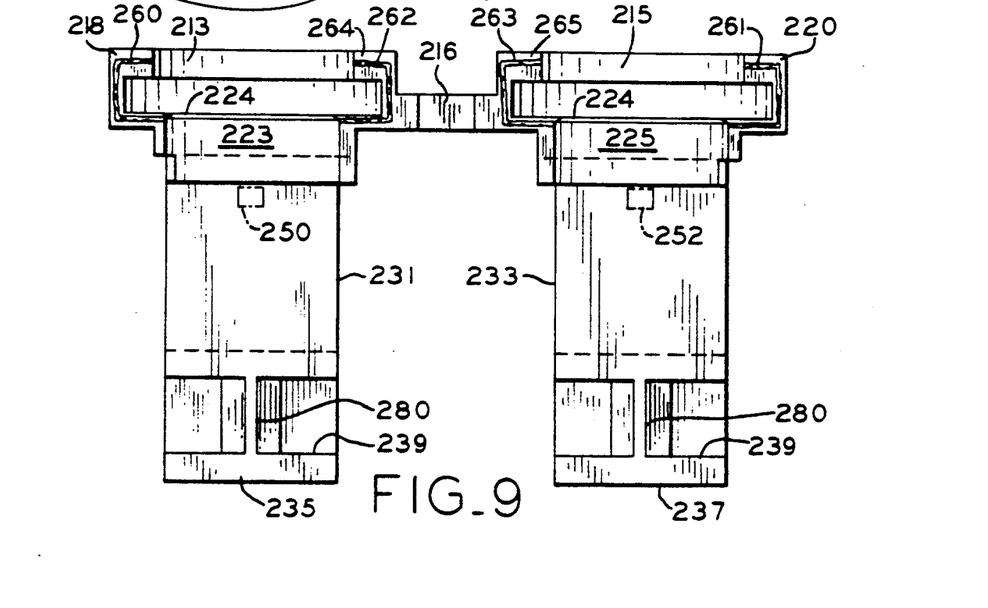
FIG. 9 shows a plan view of the embodiment of the invention shown in FIG. 7.

FIG. 9 shows a plan view of bushing 211 of FIG. 7 in the fully open position. Clearly visible in FIG. 9 are surfaces 223 and 225, which are disposed immediately adjacent cylindrical member 266 when bushing 211 and overload protector 254 are operably positioned, and bead 224 which acts to provide a seal around cylindrical member 266. As illustrated, bead 224 is triangularly shaped and tapers to a "feather edge" so as to contact cylindrical member 266 in such a way as to not increase significantly the effort required to reset, or otherwise operate, member 266 and overload protector 254. Also visible in FIG. 9 are elements 250 and 252 which are wedge-shaped elements integrally molded, respectively, into the back surface (as viewed in FIG. 7) of portions 227 and 229. Elements 250 and 252 abut annular surface 256 (FIG. 7) of overload protector 254 so as to wedge overload protector 254 into tight, non-moving contact with bushing 211.

Also visible in FIG. 9 are beads 260 and 261 which are disposed on surfaces 218 and 220, respectively. Beads 260 and 261 are thin, raised beads of resinous material which abut and "crush" when bushing 211 is operably closed around cylindrical member 266 so as to increase the quality and efficiency of the seal formed between surfaces 218 and 220. It is to be clearly understood that this feature is an optional, but advantageous, feature which may be particularly useful in situations where an additional degree of sealing (i.e., above that obtained by abutting surfaces 218 and 220 directly) is desired or required. Similar beads 262 and 263 are shown on surfaces 264 and 265, respectively.

Figure 10:
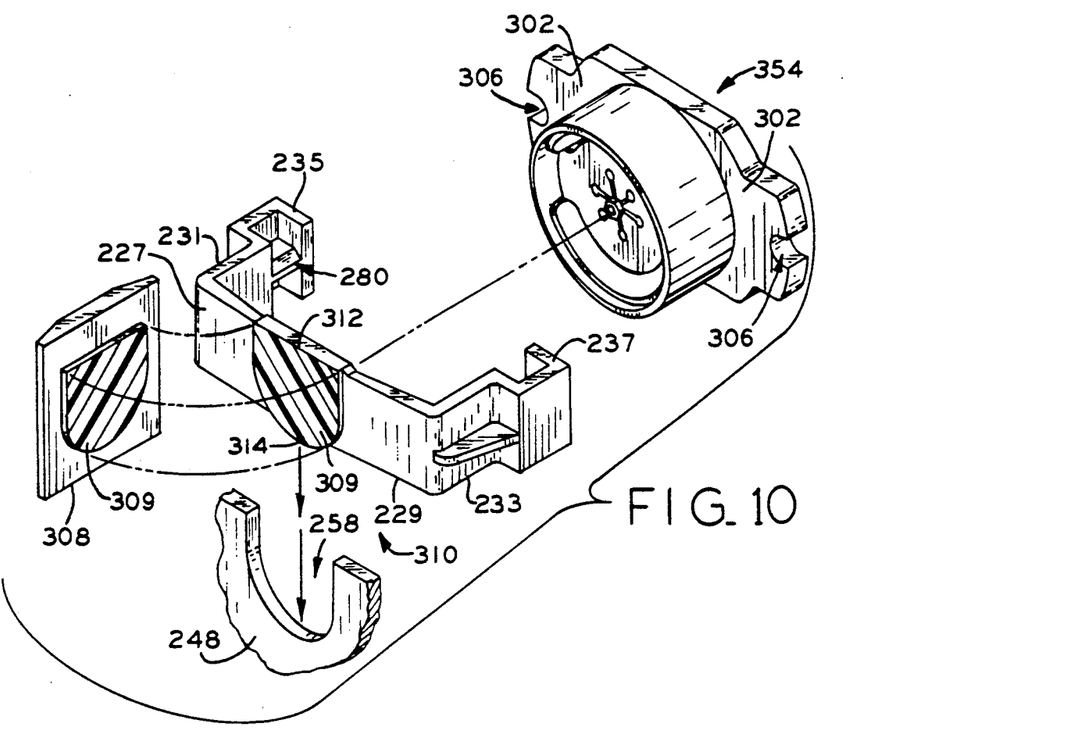
FIG. 10 is a fragmentary exploded perspective view showing another embodiment of the apparatus aligned to engage a U-shaped opening.
Figure 11:
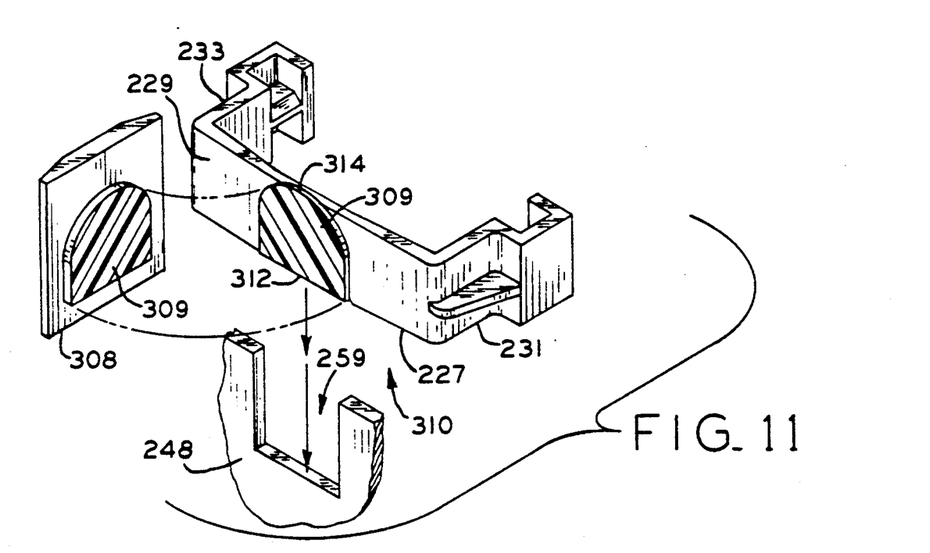
FIG. 11 is a fragmentary exploded perspective view illustrating a portion of the embodiment of FIG. 9 inverted and aligned to engage a rectangular opening.

FIGS. 10 and 11 show a mounting bushing 310 for an automatic reset overload protector 354. The automatic reset protector 354 has no cylindrical reset member 66, 166, 266. Therefore, mounting bushing 310 has a solid resinous portion 309 in place of the cylindrical passageway of the embodiments of FIGS. 1-9. Bushing 310 is shown in FIGS. 10 and 11 as being formed in a single piece, rather than as two symmetrical and hinged portions. It is to be clearly understood that bushing 310 can also be formed from hinged segments of the type shown and discussed in connection with the previous embodiments. Indeed, forming the bushing of two (or more) segments may be advantageous due to excess shrinkage which may be encountered in molding relatively large pieces from commonly available thermoplastic resins. However, it may be possible to utilize many, if not all, of the features of the invention, as discussed above, in a one-piece structure.

A flat end plate 308 is provided on portion 309 so that when portion 309 is positioned within a U-shaped opening 258 (FIG. 10) or a rectangular opening 259 (FIG. 11) in a motor shell 248, the opening 258 (259) is covered by plate 308, thereby restricting the entry of dust and moisture into the motor shell 248. In the one-piece embodiment of the invention shown, plate 308 is similarly formed in a single piece. If bushing 310 is formed in segments similar to those shown in connection with bushing 211, plate 308 may be segmented or, alternatively, solid and formed integrally with one half or the other of a segmented portion 309.

It should be specifically noted that portion 309 is formed with a U-shaped cross-section which has a generally flat surface 312 on one end thereof, and a generally rounded surface 314 on an opposing end thereof. This construction allows mounting bushing 310 to fit as shown in FIG. 10 within a U-shaped opening, such as opening 258, which substantially conforms to the curvature of surface 314. If, on the other hand, a rectangular opening, such as opening 259 of FIG. 11, is provided in the motor shell, mounting bushing 310 can simply be inverted so that surface 312 is positioned to conform to the bottom surface of the rectangular opening. This feature, which may similarly be provided in the embodiment of the invention shown in FIGS. 7-9, allows the same bushing to be used to mount overload devices in a variety of motor types.

Although the invention has been described in detail with reference to certain preferred embodiments, variations and modifications exist within the scope and spirit of the invention as described and defined in the following claims.

What is claimed is:

1. An apparatus for mounting an overload protector having first and second portions within an opening in a motor shell, the mounting apparatus comprising:

a plurality of segments, each segment having a first part and a second part wherein the first parts of the respective segments are adapted to be cooperatively positioned around the first portion of the protector, each of said first parts having a first surface adapted for positioning adjacent an exterior surface of said first portion of the overload protector, and second surface adapted for positioning within the opening in the motor shell;

the second surfaces of the first parts include first means for securing the segments within the opening so as to restrict movement of the mounting apparatus and overload protector relative to the motor shell;

each of the second parts include second means for engaging a flange on the second portion of said overload protector to restrict relative axial and rotational movement between the segments and the overload protector; and wherein the second parts of the respective segments include first portions which extend outwardly and generally perpendicularly from a common axis of the first parts formed when the first parts are cooperatively positioned around the first portion of the overload protector, and second portions which extend generally perpendicularly from ends of the first portions and generally parallel to the common axis of the first parts.

2. The mounting apparatus of claim 1, wherein the flange is formed to include mortises and the second means includes tenons.

3. The mounting apparatus of claim 1, wherein the first surfaces are formed to include flexible engagement means for cooperating with each other and with the first portion of the overload protector to reduce the likelihood of entry of moisture and dust into the overload protector between the joined first parts and the first portion of the overload protector.

4. The mounting apparatus of claim 1, further comprising a hinge for joining the segments together to form a unitary structure.

5. The mounting apparatus of claim 4, wherein said unitary structure is formed of a resinous material.

6. The mounting apparatus of claim 1 wherein the motor shell includes an edge portion defining an opening therein, and said first means comprises a peripheral groove adapted to receive the edge portion of the motor shell.

7. The mounting apparatus of claim 1, wherein each of the segments extends outwardly from an exterior surface of the motor shell when the mounting apparatus is positioned within the opening in the motor shell to reduce the likelihood of damage to the overload protector.

8. The mounting apparatus of claim 1, wherein each of the first parts of the plurality of segments have mating surfaces which abut when the mounting apparatus is operably positioned to restrict movement of the overload protector, and further comprising means for providing a seal to prevent the ingress of dust and moisture along said abutting surfaces.

9. The mounting apparatus of claim 8, wherein said means for providing a seal comprises a bead formed on at least one of said abutting surfaces.

10. The mounting apparatus of claim 8, wherein said means for providing a seal comprises a crushable bead integrally formed on at least one of said mating surfaces such that when said surfaces abut, the bead contacts and deforms against the adjacent surface to effect a positive seal between said surfaces.

11. The apparatus of claim 1, wherein the first means for securing the segments within the opening includes a rounded portion and a rectangular portion for selectively mounting the overload protector within one of a U-shaped opening and a rectangular-shaped opening in a motor shell.

12. An apparatus for mounting an overload protector within an opening in a motor shell having an edge portion defining an opening therein, the mounting apparatus comprising:
   a pair of generally symmetrical segments, each segment having a first part and a second part, each first part having a first surface, the first surfaces of the first parts defining a passageway when the segments are joined to form the apparatus, the passageway adapted to receive a first portion of the overload protector, each of said first parts further having a second surface, said second surface having a first means formed thereon for securing the mounting apparatus within the opening in the motor shell;
   second means formed on the second parts for engaging flanges on a second portion of said overload protector to restrict relative movement between the segments and the overload protector, wherein the flanges of the second portion are formed to include mortises and the second means for engaging the flanges of the second portion of the overload protector includes tenons, wherein the second parts of the respective segments include first portions which extend outwardly and generally perpendicularly from a longitudinal axis of the passageway, and second portions which extend generally perpendicularly from ends of the first portions and generally parallel to the longitudinal axis of the passageway.

13. The mounting apparatus of claim 12, wherein the first surfaces are formed to include flexible engagement means for cooperating with each other and with the first portion of the overload protector to reduce the likelihood of entry of moisture and dust into the overload protector between the joined first parts and the first portion of the overload protector.

14. The mounting apparatus of claim 12, further comprising a hinge for joining the segments together to form a unitary structure.

15. The mounting apparatus of claim 14, wherein said unitary structure is formed of a resinous material.

16. The mounting apparatus of claim 12, wherein said first means formed on the second surfaces for securing the mounting apparatus within the opening in the motor shell comprises a peripheral groove adapted to receive the edge of the opening in the motor shell.

17. The mounting apparatus of claim 12, wherein each of the segments extends outwardly from an exterior surface of the motor shell when the mounting apparatus is operably positioned within the opening in the motor shell so as to reduce the likelihood of damage to the overload protector.

18. The mounting apparatus of claim 12, wherein each of the first parts of the plurality of segments have mating surfaces which abut when the mounting apparatus is operably positioned to restrict movement of the overload protector, and further comprising means for providing a seal to prevent the ingress of dust and moisture along said abutting surfaces.

19. The mounting apparatus of claim 18, wherein said means for providing a seal comprises a bead formed on at least one of said abutting surfaces.

20. The mounting apparatus of claim 18, wherein said means for providing a seal comprises a crushable bead integrally formed on at least one of said mating surfaces such that when said surfaces abut, the bead contacts and deforms against the adjacent surface to effect a positive seal between said surfaces.

21. The apparatus of claim 12, wherein the first means for securing the mounting apparatus within the opening includes a rounded portion and a rectangular portion for selectively mounting the overload protector within one of a U-shaped opening and a rectangular-shaped opening in a motor shell.

22. The mounting apparatus of claim 21, wherein said segments are formed to include flexible engagement means for cooperating with each other and with the first portion of the overload protector to reduce the likelihood of entry of moisture and dust between the joined segments and the first portion of the overload protector.

23. The mounting apparatus of claim 22, wherein said flexible engagement means contacts a movable part of the first body portion of the overload protector so as to reduce the likelihood of entry of moisture and dust, but so as to not substantially increase the force required to move said movable part.

24. An apparatus for mounting an overload protector having first and second body portions within an opening in a motor shell, the shell having an edge portion defining an opening therein, the mounting apparatus comprising:
   a plurality of segments;
   means formed on each of the segments for securing the segments within the opening so as to restrict movement of the mounting apparatus relative to the motor shell;
   means formed on each of the segments for engaging flanges on the second portion of the overload protector so as to restrict movement of the overload protector relative to the segments, wherein said means for engaging includes a tenon formed on each segment for engaging a corresponding mortise formed in each of the flanges of the second body portion of the overload protector; and wherein the means for engaging includes a first portion on each of the segments which extends outwardly and generally perpendicularly from a common axis formed by the plurality of segments, and a second portion on each of the segments which extends generally perpendicularly from ends of the first portion and generally parallel to the common axis of the segments.

25. The mounting apparatus of claim 24, further comprising a hinge for joining the segments together to form a unitary structure.

26. The mounting apparatus of claim 25, wherein said unitary structure is formed of a resinous material.

27. The mounting apparatus of claim 24, wherein said means formed on the segments for securing the segments within the opening comprises a peripheral groove adapted to receive the edge portion of the motor shell.

28. The mounting apparatus of claim 24, wherein each of the segments extends outwardly from an exterior surface of the motor shell when the mounting apparatus is operably positioned within the opening to reduce the likelihood of damage to the overload protector.

29. In combination, a motor having a shell formed to include an edge defining an opening that is one of U-shaped and rectangular, and a reversible apparatus for mounting an overload protector having first and second body portions within said opening in the motor shell, the apparatus comprising:

first means for mounting the overload protector within a U-shaped opening in a motor shell so as to restrict movement of the mounting apparatus and overload protector assembly relative to the motor shell; and second means for alternatively mounting the overload protector within a rectangular opening in a motor shell so as to restrict movement of the mounting apparatus and overload protector assembly relative to the motor shell.

30. The apparatus of claim 29, further comprising flexible engagement means formed on the apparatus for cooperating with the first portion of the overload protector to reduce the likelihood of entry of moisture and dust between the mounting apparatus and the first portion of the overload protector.

31. The apparatus of claim 29, further comprising a plurality of segments.

32. Apparatus for mounting an overload protector within an opening in a motor shell, comprising:

a one-piece, molded body, said body having:

a first part extending generally parallel to and adjacent a first surface of the overload protector, said first part having means integrally formed therein for engaging an edge portion of the opening in the motor shell to secure the body therein;

second parts extending generally perpendicularly from ends of the first part and adjacent a second surface of the overload protector; and third parts extending generally perpendicularly from ends of the second parts for engaging the overload protector to secure the protection to the body.

33. The apparatus of claim 32, wherein the third part includes means for lockingly engaging the overload protector.

34. The apparatus of claim 33, wherein the means for engaging the overload protector is formed to engage the protector with a snap-fit.

35. The apparatus of claim 32, wherein the first part is formed to include a stabilizing projection to rest on a surface of the overload protector when the apparatus is operably engaged with the overload protector.

36. The apparatus of claim 32, wherein the apparatus is formed of a flexible, resinous material.

* * * * *